Figure 9:
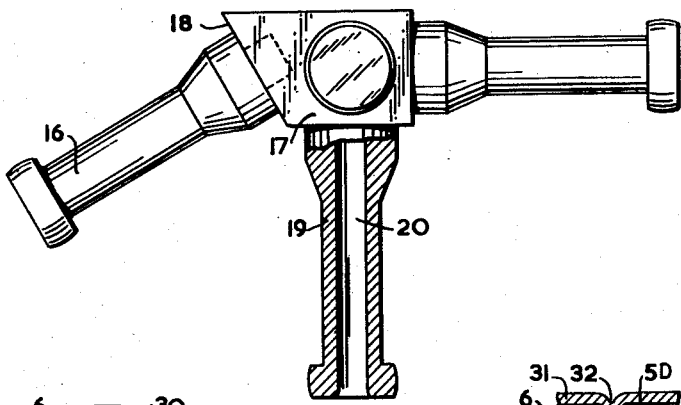

Nov. 3, 1964 P. CADOVIUS 3,155,405
ASSEMBLING JOINT FOR ASSEMBLING FRAMEWORK COMPRISING TUBULAR
RODS, AND FRAMEWORK WITH SUCH ASSEMBLING JOINTS
Filed Feb. 14, 1961 5 Sheets-Sheet 1
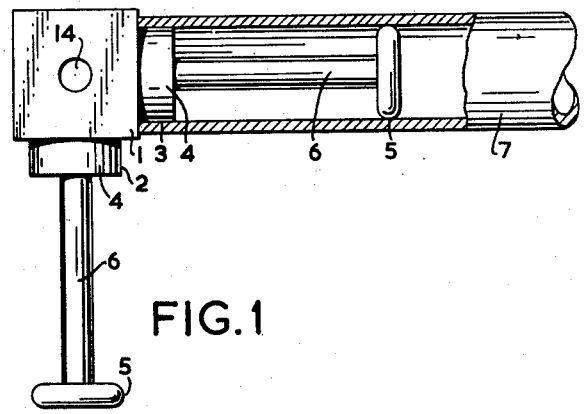
FIG.1
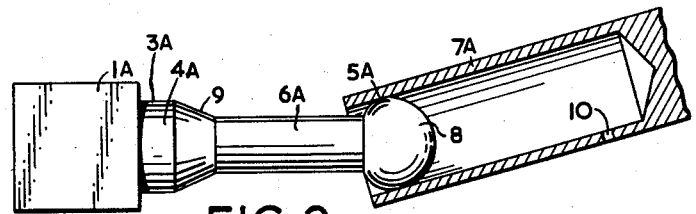
FIG.2
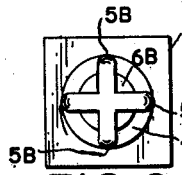 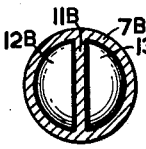 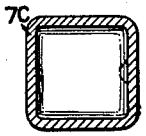 
FIG.3  FIG.4  FIG.5  FIG.6
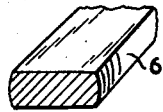 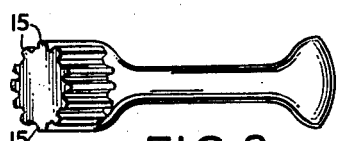
FIG.7  FIG.8
INVENTOR
Poul Cadovius
BY *Stevens Davis Miller & Mosher*
ATTORNEYS Nov. 3, 1964 P. CADOVIUS 3,155,405
ASSEMBLING JOINT FOR ASSEMBLING FRAMEWORK COMPRISING TUBULAR
RODS, AND FRAMEWORK WITH SUCH ASSEMBLING JOINTS
Filed Feb. 14, 1961 5 Sheets-Sheet 3

INVENTOR

Poul Cadovius

BY *Stevens Davis Miller & Mosher*

ATTORNEYS

Nov. 3, 1964   P. CADOVIUS   3,155,405
ASSEMBLING JOINT FOR ASSEMBLING FRAMEWORK COMPRISING TUBULAR
RODS, AND FRAMEWORK WITH SUCH ASSEMBLING JOINTS
Filed Feb. 14, 1961   5 Sheets-Sheet 4

INVENTOR
Poul Cadovius
BY *Stevens Davis Miller & Mosher*
ATTORNEYS

Nov. 3, 1964 P. CADOVIUS 3,155,405
ASSEMBLING JOINT FOR ASSEMBLING FRAMEWORK COMPRISING TUBULAR
RODS, AND FRAMEWORK WITH SUCH ASSEMBLING JOINTS
Filed Feb. 14, 1961 5 Sheets-Sheet 5

INVENTOR
Poul Cadovius
BY *Stevens Davis Miller & Mosher*
ATTORNEYS

United States Patent Office 3,155,405
Patented Nov. 3, 1964

3,155,405
ASSEMBLING JOINT FOR ASSEMBLING
FRAMEWORK COMPRISING TUBULAR
RODS, AND FRAMEWORK WITH SUCH
ASSEMBLING JOINTS
Poul Cadovius, Ildervej, Skaade Bakker,
pr. Hojbjerg, Denmark
Filed Feb. 14, 1961, Ser. No. 89,186
6 Claims. (Cl. 287—54)

This application is a continuation-in-part of my co-pending application Ser. No. 841,369 filed September 21, 1959, now abandoned, and relating to "An Assembling Joint for Assembling Framework Comprising Tubular Rods."

The invention relates to an assembling joint for assembling framework comprising supports in the form of tubular rods which assembling joint is provided with at least one pin member over the end of which can be slid the end of a tubular rod in spigot and socket fashion. The expression "tubular rod" comprises rods with any adequate cross section and being hollow at least at both ends.

Furthermore the invention relates to frameworks comprising assembling joints according to the invention.

In assembling framework of this type it is difficult to slide especially the rods, which are to be inserted last, over the pins from want of free space in the direction of the axis of the pin. Nearly always—even in the case of a simple framework as e.g. a rectangular frame with four rods and four corner joints—there will be rods or assembly joints in this direction which will hamper the assemblage of the components in a simple way or make it impossible.

It is an object of the invention to provide a new and improved construction of an assembling joint which construction facilitates assembling a framework and disconnection of same.

It is another object of the invention to provide an assembling joint which ensures the stability of the construction when the assembling of the framework has been completed but which still permits a considerable flexibility as long as the components are not finally assembled.

According to the invention this is achieved by a special design of the assembling joint viz. so that the pin member or pin members between the bottom end and the outer end are provided with a reduced cross section in relation to the inner cross section of the tubes and so that a rod when slid over the pin member initially can take up positions in which the axis of the tube forms a perceptible angle with the axis of the pin member while the axis of the tube when the tube has been slid completely over the pin member so that the end of the tube has passed the reduced cross section of the pin member coincides with the axis of the pin member.

According to the invention the design of the pin members of the assembling joint may also be conceived as a design in which each pin member only has fitting surfaces near the free end of the pin member and near its root which fitting surfaces only determine the position of the rod or the tube in space when both fitting surfaces are contacting the inner surface of the tubular rod. The expression "fitting surface" here also comprises types of contact elements which strictly geometrically are called points or lines. Point contact or linear contact between a fitting surface or a tube will generally only be considered inside the outer fitting zone i.e. the fitting zone which contacts or lies near the free end of the pin member. As will be obvious from the following specification, point or linear contact between the outermost end of the tube and the pin member along the fitting surface of the root end of the pin member may also occur.

Figure 10:
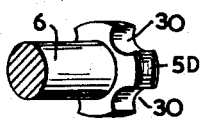
Figure 11:
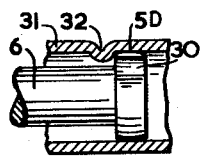
Figure 13:
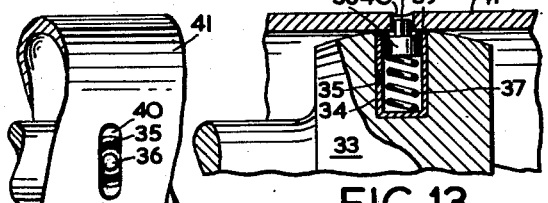
Figure 12:
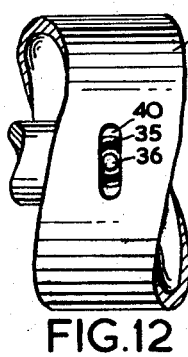
Figure 14:
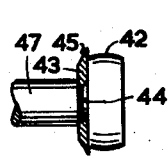
Figure 15:
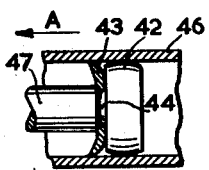
Figure 16:
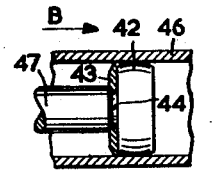
Figure 17:
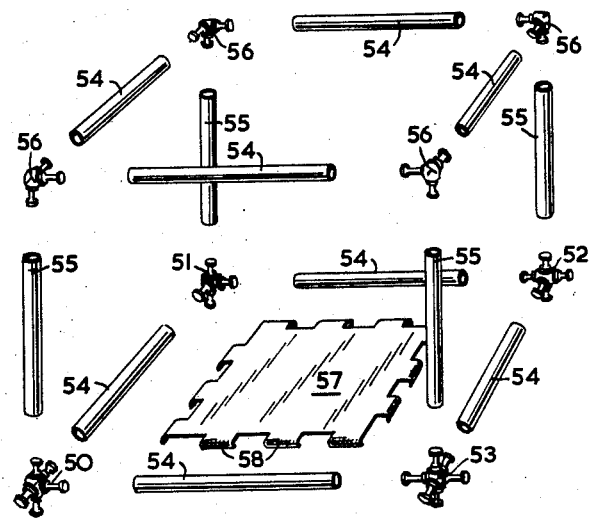
Figure 18:
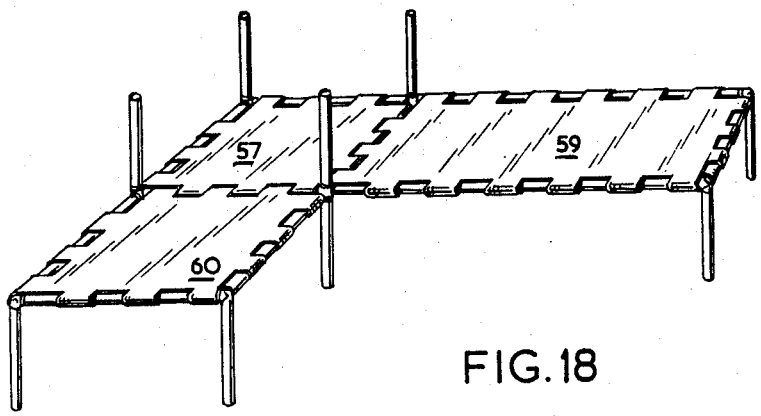
Figure 19:
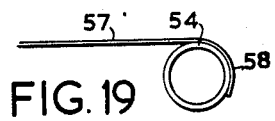
Figure 20:
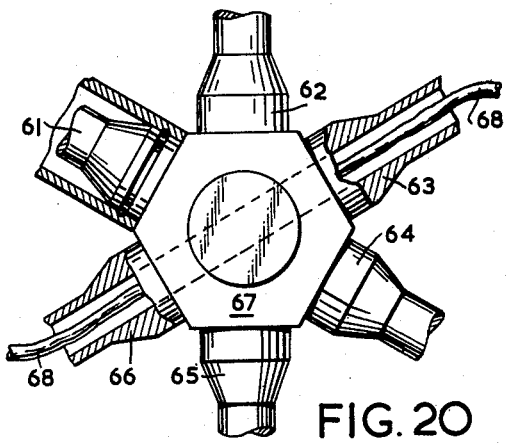
Figure 21:
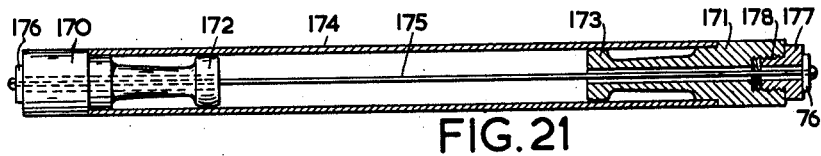
Figure 22:
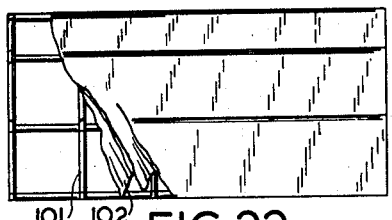
Figure 23:
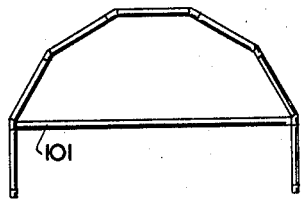
Figure 24:
Figure 25:
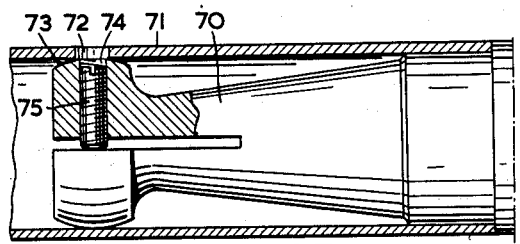
Figure 26:
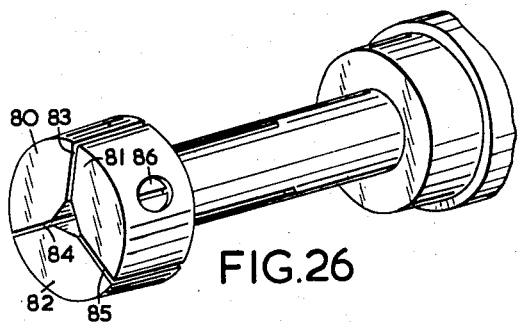
Figure 27:
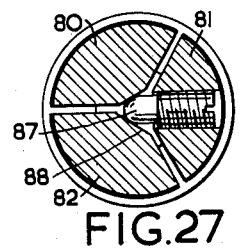
Figure 28:
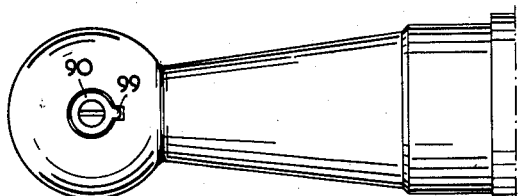
Figure 29:
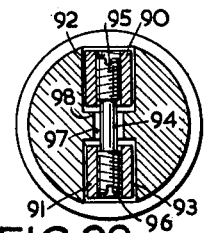

In the following the invention is explained further with reference to the accompanying diagrammatical drawings in which FIG. 1 shows an assembling joint member according to the invention with a single tube fitted and shown partly in section, FIG. 2 shows another embodiment of an assembling joint member according to the invention in which a tubular rod shown partly in section is being fitted in its place, FIG. 3 shows a third embodiment of a pin member of an assembling joint member according to the invention seen from the end, FIG. 4 shows a cross section in a part of another embodiment according to the invention, FIG. 5 shows a cross section in an embodiment with rectangular pin member and socket, FIG. 6 shows a cross section in an embodiment with triangular tube and Y-shaped pin member, FIG. 7 shows a section of a part of a pin member with a special kind of reduced cross-section, FIG. 8 shows a part of an embodiment of a bone-shaped pin member with linear contact in the fitting zone by the root end of the pin member, FIG. 9 shows an embodiment of an assembling joint according to the invention with four pin members, FIG. 10 shows in perspective a part of a pin member for an assembling joint element according to the invention made with regard to achievement of a locking or securing, FIG. 11 shows partly in section the pin member shown in FIG. 10 inserted in a tube, FIGS. 12 and 13 show partly in section a part of the outer end of a pin member inserted in a tube and provided with a special locking or securing mechanism seen from above and in section respectively, FIGS. 14–16 are illustrations for explanation of the effect of a frictional locking member on a pin member, FIG. 17 is an exploded view of a framework according to the invention, FIG. 18 shows in perspective a part of an assembled framework with mounted shelves, FIG. 19 is a side view of a part of a shelf and a rod illustrating the securing of the shelf, FIG. 20 shows partly in section a part of another embodiment of an assembling joint according to the invention, FIG. 21 is a partial section through a tube and two assembling joint elements according to the invention, FIGS. 22 and 23 show a building e.g. a garage seen from one end and from the side respectively and built by assembling joint elements according to the invention, FIG. 24 shows in perspective a facing mounted with electric apparatus, FIG. 25 shows partly in section a socket end and an expansible pin member, FIG. 26 is a perspective view of another embodiment of an expansible pin member, FIG. 27 shows a cross-section in the pin member illustrated in FIG. 26 showing a screw for expanding the end of the pin member, FIG. 28 is a side view of a part of another embodiment of an expansible pin member, and FIG. 29 is a cross section through the pin member and the enclosed expansion mechanism.

On the drawing 1 designates an assembling joint consisting of a cubic carrying element 1 (or any shape e.g. spheric) from the surface of which protrude pin members. Any number of pin members may be chosen. In the embodiment shown there are two pin members 2 and 3 but there may also be six or more. In the example shown the angle between the axes of the pin members is 90° but in some cases it may be adequate to use other angles as e.g. shown in FIG. 9.

The pin members have a pair of fitting surfaces in two interspaced zones. One fitting surface lying at the root end of the pin member is designated 4, the other situated at the outer end of the pin member is designated 5. Between the fitting surfaces the pin member has a reduced cross section viz. on the part designated 6 on FIG. 1.

In FIGURE 1 the fitting surfaces 4 at the root end of the pin members are cylinder surfaces while the fitting surfaces 5 are doubly curved surfaces e.g. part of a spherical surface so that contact between the fitting surface 5 and a tube 7 which is slid over the pin member by a slide fit only contacts along a circle no matter which of the possible angles the axis of the tube forms with the axis of the pin member i.e. that it is only linear contact. This causes that the tube 7 when pulled away from the pin member i.e. towards the right hand side on FIG. 1 so that it gets clear of the fitting surface 4 but not of the fitting surface 5 can be pivoted thus that the axis of the tube forms an angle with the axis of the pin member in the same way as is shown by the embodiment shown in FIG. 2 in which the tubular end of a rod is shown slid over a spherical fitting surface 8 at the outer end of the pin member.

In FIGS. 1 and 2 the greater part of the length of the pin member is cylindrical but if there are used tubes with other kinds of cross sections the fitting surfaces of the pin members must be designed with cross sections fitting the cross sections of the tubes.

If the tube is of circular cross section, the number of contact points on the fitting surfaces 5 of FIGURE 1, for example, need only amount to three to provide the necessary stability. In the example shown in FIGURE 3 there are four points of contact, and this design is suited for circular, oval and polygonal tubes.

FIGS. 3, 4, 5, and 6 show several of the many possible designs of cross sections of the pin members which in these figures are seen in direction towards the ends of the pin members. In FIGS. 4, 5, and 6 corresponding tubes are slid over the pin members.

In FIG. 3 the pin member is cross shaped in the outer fitting zone and a cylindrical tube which is slid over the fitting surface will therefore theoretically only touch this in four points. In FIG. 5 a cross section of the pin member at that place of the outer fitting surface where the pin member contacts the tube is mainly rectangular fitting to a tube with a rectangular cross section. In FIG. 6 the cross section is Y-shaped at the place in question corresponding to a tube the cross section of which is shaped like an isosceles.

FIG. 4 illustrates the possibility that the outer fitting surface is extensible e.g. by a wedge 11B or the like which is fastened inside the tube so that the wedge presses the two parts 12B and 13B of the slotted end of the pin member from each other when the tube is slid over the pin member. In FIGURE 5 the dashed lines show protrusions on the inner wall of the tube as a means for arresting movement of the pin.

The shape of the outer fitting surface is only limited by the condition that the axis of the tube and the axis of the pin member may form angles with each other as long as the tube does not fit over the fitting surface of the root end of the pin member.

The fitting surface at the root end of the pin member may be made in different ways so that either face contact or linear contact or point contact is achieved. In FIGS. 1 and 2 there is face contact while at the embodiment outlined on FIG. 8 where the pin member is bone-shaped linear contact is achieved because the tube which is slid over the fitting surface contacts along a row of lines corresponding with the ridges of the shown teeth 15 which form a row of elementary interspaced fitting surfaces being parallel with the axis of the pin member. By a such embodiment where the root end is made up by a gear-wheel-like member there is the advantage that dirt may settle between the teeth and thus will not get in the way when the tube is slid over the fitting surface. The fitting surfaces may by the way be smooth, grooved or rough or have any other adequate surface.

With a regard to the fact that the elements should easily be disconnected and assembled they should fit into each other wtih slide fit. When this is the case at both fitting surfaces a stable construction is at the same time achieved. The construction according to the invention allows added stability by the fact that the two fitting zones of a pin member can be placed relatively far from each other. The assembling is not made difficult by this because friction is not increased as e.g. is the case if a cylindrical pin member is made longer.

The outer most end of the pin with the fitting surfaces 5, as shown in FIGURE 1, may have an optional suited shape, the sole condition being that it must not prevent a swinging of the tube when the latter is out of engagement with the fitting surface 4, but should otherwise support the tube as far as possible immovably when the tube end has been led in over the fitting surface 4. In the case of circular tubes the end of the pin may be spherical with a view to maintaining contact during swinging movement of the tube.

The part of the pin member 6 which has a reduced cross section may also have different shapes of cross sections. In FIG. 2 the cross section-shape is circular and when the end of the tube is drawn clear of the fitting surface 4A the tube can be moved anywhere inside a space limited by a conic surface. If it is desired that the tube may only make a limited move in one plane the cross section of the part 6C of the pin member can be designed as shown in FIG. 7 where it is limited at two facing sides by plane parts and at the other two facing sides by cylindrical parts.

In the embodiment shown in FIG. 2 there is a conic face 9 at the transition from the cylindrical part 6A of the pin member to the cylindrical fitting surface 4A so that the entering of the tube 7A over the pin member and onto the fitting surface 4A is facilitated. The inner fitting surface 4A may be of slightly conical shape to avoid slip owing to tolerances in the dimensions of the cylindrical tubes.

In the embodiment shown in FIG. 9 of the assembling joint acording to the invention the pin members e.g. 19 are hollow as is seen from the shown section of one of the pin members 19, 20. In big assembling joints this may be of importance in making the assembling joint and with that the framework built by the assembling joints lighter. In buildings the hollow assembling joints can be used thus that conductors are led through them e.g. for water or electricity. It is also possible to use the framework itself as conductor of a liquid e.g. water but then there must be seen to the fact that the tubes fit tightly over the pin members possibly by using packings so that leaking out is avoided.

FIG. 9 illustrates also the possibility that the assembling joints consist of single elements i.e. loose pin members 16 which can be screwed into a support 17. This has the advantage that it is not necessary to possess a great number of different assembling joints as pin members can be put in and taken out as required.

It is not necessary to make special arrangements to lock the different parts together in frameworks of the size used as support for shelves in show-windows or in framework used in toys as the necessary stability can be secured by an appropriate choice of the fitting between tubes and assembling joints. Different arrangements can be made to increase stability in bigger frameworks. In FIG. 1 is e.g. shown a hole 14 in the carrying member of the assembling joints. If the framework is used up a wall e.g. as book-shelf the framework can be fastened to the wall by screwing a screw through the hole 14 and into the wall. If the two upper and outermost assembling joints of a framework are fastened in this way to a wall it is at the same time prevented that the tubes in between can be pulled away from the pin members.

If a mutual securing or locking between assembling joints and tubular rods is desired it can according to the invention be achieved either by special embodiments or by special securing or locking members.

FIGS. 10 and 11 illustrate an embodiment in which in the outer fitting surface 5D of a pin member of which only a part is shown in the figure there are incisions 30 of a such size that the fitting surface 5D of the pin member easily can be inserted in a tube 31 which has a local impression 32 when the pin member and the tube are correctly placed in relation to each other. When the fitting surface 5D has passed the impression 32 tube and pin are turned in such a way in relation to each other that extraction of the pin cannot take place. There may be several impressions e.g. as many as there are incisions 30 in the pin member which in the case shown are four.

If a permanent assembling is desired the tube can be provided with an impression after it has been placed on the pin member which then does not need incisions 30. The tube may possibly be provided with a hole 10 as shown in the FIGURE 2 into which a locking member e.g. a rivet or a screw can be fitted after the assembling. A such hole 10 may furthermore serve as a venting hole whereby resistance against the assembling caused by compressed air in the tube is avoided. Permanent assembling may also be achieved by welding or by any other suitable arrangement e.g. by a bayonet lock. With regard to the stability it is after all preferred that there are used securing mechanisms which do not lead to weakening of the outermost part of the tubes which must contact the fitting surface lying at the root end of the pin members. By using oblique surfaces it is achieved in a way known per se that pin member and tube are pressed together when they are turned in relation to each other. It must, however, by such constructions be taken into consideration that a turning of a tube in a certain direction results in different directions of rotation seen from one and the other end of the tube respectively.

By bigger constructions the embodiment shown in FIG. 13 can be used in which the outer end 33 of a pin member which is shown only in part there is a radial bore 34 in which is fitted a locking mechanism consisting of a cylindrical locking pin 36 placed in a cylindrical house 35 which is biased by a compression spring 37 which in one end rests against the bottom of the house and in the other end against the locking pin 36. The locking pin is prevented in leaving the house as a result of the presence of a shoulder 38 which above contacts a bevelled edge 39 around the aperture through which the locking pin 36 protrudes from the house 35. The locking pin 36 is meant to enter a hole 40 in a tube 41. The hole 40 may be an oblong hole which runs in direction of the circular circumference of the tube so that the insertion of the locking pin is not strictly dependent on the fact that the tube is placed in the correct angular position in relation to the locking pin. The locking pin 36 may be cut off oblique with regard to facilitating the assembling of the assembling joints and tubes. If it is desired that the tube be freed from the assembling joint this can be done by impressing of the locking pin from the outside possibly by a tool specially made which has an impressing member with a cross section which corresponds with the shape of the hole 40. There may be more e.g. two locking mechanisms lying diametrically opposite each other. In this case the tools for impressing of the locking pin may be made as a pair of tongs. The locking mechanisms of the kind dealt with here are adequately made in such a way that they can easily be fitted in and taken out so that they are to be used only in the cases where it is necessary. The locking mechanism is shown placed in the outer fitting zone but may also be inserted in the pin member within the root end fitting zone.

FIGS. 14 to 16 illustrate another arrangement for preventing the tubes from being pulled off the pin members. FIG. 14 shows a part of a pin member 47 with a discoid outer end 42 the outer circumferential surface of which is shaped like a part of a spherical surface. Contacting the one plane side of the discoid part 42 is a ring-shaped disc 43 of elastic frictional material e.g. rubber. The disc 43 is shown in section and it is seen that it is kept in place on the pin member by engaging a circular notch 44. The disc is along the circular edge cut off oblique as shown at 45 where the side face with the biggest diameter is turned towards the part 42. The oblique cutting off is not necessary but is in some cases adequate. The effect of the disc 43 is explained with reference to FIGS. 15 and 16 which show how the disc 43 is deformed either when a tube 46 is slid over the corresponding pin member or it is tried to pull it off the pin member. In FIG. 15 the arrow marked A indicates that the end of a tube is slid over a pin member fixed in space so that the edge of the disc 43 because of friction is bent away from the outer end 42 of the pin member. The disc may on the side face which by this operation contacts the inside of the tube have a smaller frictional coefficient than the rest. The tube may thus be slid freely over the pin member. In FIG. 16 the arrow B indicates that it is tried to pull the tube 46 off the pin member again. In this case the outer edge of the disc 43 wedges in between the inner wall of the tube and the outer surface of the part 42 and thereby hinders the pulling off. If it is desired to pull the tube 46 off the pin member this may be achieved by turning the tube round its axis while it is slowly pulled outwards. In this case the edge of the disc 43 remains in the position shown in FIG. 15 so that no wedging of frictional material between tube and pin member will occur.

The principle of the locking mechanism is that the friction mainly is effective when a tube is moved in one direction. Similar mechanisms may be made in many different ways inside the limits of the invention and may e.g. be placed as a ring lying in a hollow in the fitting surface at the root end where the mounting will not influence the stability.

In FIG. 17 an exploded view of a part of a framework is shown which framework is assembled by assembling joints according to the invention. There are four assembling joints 50, 51, 52, and 53 of which the assembling joints 50 and 52 are alike as they both possess four pin members lying in one plane and a fifth pin protruding perpendicular to this plane. The assembling joint 51 has only three pin members lying in one plane and a fourth pin perpendicular to this plane. The assembling joint 53 has six pin members in all lying as the axes in a orthogonal cubic system of co-ordinates. Tubular rods 54 make up horizontal parts of the framework while other tubular rods 55 make up vertical parts of the framework. In the framework in FIG. 17 there are eight assembling joints and twelve rods in all which together from a cube. The four assembling joints lying at the upper end are designated 56. These assembling joints have only three pin members each.

When the framework is assembled boards or shelves may be fitted onto the framework. In FIG. 17 there is shown a single shelf 57 which along the edge has bent-over parts 58 which engage the tubular rods preferably in such a way that a locking is achieved as is indicated in FIG. 19 which shows a part of a shelf 57 seen towards the edge and a tube seen in the axial direction. The shelf 57 may be of a metal e.g. iron so that the bent-over part 58 is resilient and catches the tube 54 as a snap-lock. In FIG. 17 there is only shown a shelf 57 but corresponding boards can be placed as sides and lid in the framework.

In the boards 57 there are incisions on the sides along which further building is to take place. Fig. 18 shows an embodiment with three boards 57, 59, and 60. On the boards may be mounted an electric apparatus 69, as shown in FIG. 24.

FIG. 20 shows a part of an assembling joint according to the invention with six pin members 61, 62, 63, 64, 65, and 66 lying with the axes in the same plane. As specified in connection with FIG. 9 the pin members may be separate pin members which are screwed into a carrying member 67 and some or all of the pin members may be hollow to leave room for conductors. In FIG. 20 it is shown by section of the pin members 63 and 66 that these are hollow and that a tube 68 e.g. a plastic tube is led through the pin members.

When the assembling joint according to the invention is used in bigger buildings e.g. a garage with framework 100 and cloth covering 101 as shown in FIGS. 22 and 23 it may be adequate that the assembling joints and the tubes are kept together by special means. FIG. 21 shows a such special arrangement where two assembling joints 170 and 171, with pin members 172, and 173, are connected with a tube 174. The assembling joints and the pin members are hollow and through the hollow is led an arrangement for bolting together which e.g. may consist of a wire 175 which at one end carries a pin or a sprig 176 which prevents that the wire is pulled through the assembling joint 170 and which at the other end has a corresponding pin or sprig 176 which contacts the collar of a bush 177 which is screwed into a thread 178 in the carrying member 171. By screwing the bush with the collars 177 out of the carrying member of the assembling joint 171 the tension in the wire 175 is increased.

In order not to make it too difficult to assemble and disassemble the elements of a framework according to the invention it is necessary that there is a small tolerance between the inner wall of the socket end of the rods and the fitting surfaces of the pin members. In small-size framework this fact does not give rise to difficulties. However, in big-size framework to be used in connection with the erection of buildings such tolerances may prove unbearable. It is a further object of the invention to devise embodiments in which by one and the same operation a securing together of the elements and a reduction of the tolerance is obtained. According to the invention measures are taken to increase the outer dimensions of a pin within a fitting zone, mainly but not exclusively along the lines indicated in connection with the embodiment shown in FIG. 4. The further development is illustrated in FIGS. 25–29.

FIG. 25 shows partly in section a pin member 70 over which is slid the socket end 71 of a rod with a hole 72. Within the outer fitting zone 73 of the pin member 70 there is a radial bore 74 with a threading in which is inserted a screw 75 of any applicable type. The end of the pin member 70 is slid up along a plane through the axis of the pin member so as to form a bifurcated pin member. As long as the screw is retracted so that the end of the screw flushes with the inner surface of that part of the pin member in which it is inserted the outer dimension of a cross section within the fitting zone is smaller than the dimensions of a cross section through the socket end of the rod, thereby permitting the entering of the socket end under a considerable angle with the axis of the pin member owing to the tolerance and the resiliency of the bifurcated end of the pin member. When the socket end has been slid completely over the pin so that fitting contact is obtained at both ends of the pin member (the position shown in FIG. 25) and the hole 72 brought into alignment with the axis of the screw 75 a tool is inserted in the hole 72, and the screw 75 is turned. By this operation the end of the screw contacts the inner surface of the lower part of the slid up end of the pin member, and spaces the two parts apart thereby reducing the tolerance between the pin member and the tubular socket eventually securing the pin member to the tube. One of the advantages of the embodiment described is that it is easy and cheap to manufacture preferably by moulding. There are no loose parts except the screw which is easily replaceable should it get lost.

A similar embodiment is shown in FIGS. 26 and 27 where FIG. 26 is a perspective view of a pin member and FIG. 27 is a cross section in the outer fitting zone of the pin member. The end of the pin member is split up in three parts 80, 81 and 82 by three radial cuts 83, 84 and 85 each forming an angle of 120° with the others. In a threaded bore in the part 81 is inserted a screw 86 the point 87, FIG. 27, of which can be brought into contact with the two other parts 80 and 82 of the pin member thereby spacing the three parts from each other and thus increasing the outer dimension of the pin within the fitting zone. Owing to the resiliency of the material, for instance steel or any other suitable material, the three parts 80, 81 and 82 move against each other when the screw is turned back. The fitting surfaces of the pin member may be slightly conical preferably in such a way that the socket end of the rod only touches the outer fitting surface along a line when entering the end of the non-expanded pin member. The end 87 of the screw 86 is spherical but may be conical. The surfaces 88 of the two parts 80 and 82 which is to be contacted by said end 87 may be shaped correspondingly. The apex of the conical surface should be chosen with such an angle that a radial pressure on each part 80, 81 and 82 is exerted.

FIG. 28 shows part of a pin member the end of which is shaped as a sphere, and FIG. 29 is a cross section within the outer fitting zone of said pin member. In this embodiment the end of the pin member is not split up but is provided with two expansion members inserted in radial bores 92 and 93 respectively, in the spherical end of the pin member. The expansion members can when operated move radially but are prevented from turning around their axis by a cam and groove guiding 99. The two expansion members are interconnected by means of a double screw 94 having right hand threading 95 at one end and left hand threading 96 at the other end. The centre part of the screw 94 passes through an aperture 97 in the wall 98 between the two bores 92 and 93.

By turning the screw 94 in one direction the two expansion members 90 and 91 are moved away from each other thereby increasing the outer dimension of the fitting surface. When turned in the opposite direction the screw 94 forces the expansion members 90 and 91 against each other thereby reducing the outer dimension of the cross section. It will be seen that in the embodiment described functioning according to the expansion principle it is possible to reduce the tolerance to any small value and even to nil. This is of great importance in big-size framework.

It is obvious to the man skilled in the art that many other ways of securing the parts together are possible within the scope of the invention from a simple one comprising only a bore in the pin member, a hole in the socket end and a securing member in the form of a pin, split or screw and to the most complicated with several mechanical parts.

While several embodiments of the invention have been shown and described it will be apparent that numerous changes and modifications may be made therein. It is, therefore, to be understood that it is not intended to limit the invention to the embodiments shown but only by the scope of the claims which follow.

I claim:

1. A joint element for assembling rod elements having unobstructed tubular ends, which joint element comprises a carrying element and a plurality of outwardly projecting pin members fixedly joined together, each of said pin members having two fitting portions spaced apart in the axial direction of the pin member and having an elongated intermediate portion of substantially reduced cross-section, said fitting portions corresponding substantially to the internal cross-sectional configuration and dimensions of said tubular ends to effect sliding engagement therewith, the one of said fitting portions remote from said carrying element being formed with a generally arcuate peripheral surface and in conjunction with said intermediate portion to permit partial intercoupling of said joint element and rod element at an angle to the axis of said pin member so that said joint element and a rod element may be assembled by initial askew intercoupling of the tubular end at the remote fitting portion of said pin member and by final aligned intercoupling of said tubular end at both fitting portions of said pin member.

2. A joint element for assembling rod elements having unobstructed tubular ends, which joint element comprises a carrying element and a plurality of outwardly projecting pin members fixedly joined together, each of said pin members having two fitting portions spaced apart in the axial direction of the pin member and having an elongated intermediate portion of substantially reduced cross-section, said fitting portions corresponding substantially to the internal cross-sectional configuration and dimensions of said tubular ends to effect sliding engagement therewith, the one of said fitting portions remote from said carrying element being formed with a generally arcuate peripheral surface and in conjunction with said intermediate portion to permit partial intercoupling of said joint element and rod element at an angle to the axis of said pin member so that said joint element and a rod element may be assembled by initial askew intercoupling of the tubular end at the remote fitting portion of said pin member and by final aligned intercoupling of said tubular end at both fitting portions of said pin member, and coacting means provided on said tubular ends and said pin members for obstructing disassembly of a rod element intercoupled with a pin member.

3. A joint which comprises the combination of a first joint member including an outwardly extending pin member and a second joint member having a tubular end adapted to fit over and slidably engage said pin member; said pin member having an inner fitting portion, an outer fitting portion and an elongated portion of reduced cross-section intermediate the inner and outer fitting portions, said outer fitting portion being formed with a generally arcuate peripheral surface and in conjunction with said intermediate portion so that said pin member and said tubular end are adapted to interfit at an angle during assembly operations, said inner and outer fitting portions being shaped so that said pin member and said tubular end are slidably engaged in alignment upon completion of an assembly operation.

4. A joint which comprises the combination of a first joint member including an outwardly extending pin member and a second joint member having a tubular end adapted to fit over and slidably engage said pin member; said pin member having an inner fitting portion, an outer fitting portion and an elongated portion of reduced cross-section intermediate the inner and outer fitting portions, said outer fitting portion being formed with a generally arcuate peripheral surface and in conjunction with said intermediate portion so that said pin member and said tubular end are adapted to interfit at an angle during assembly operations, said inner and outer fitting portions being shaped so that said pin member and said tubular end are slidably engaged in alignment upon completion of an assembly operation, and coacting means provided on said tubular end and said pin member effective upon completion of the assembly operations for obstructing disassembly of said joint members.

5. In a framework including a support, a joint element carried by the support, said joint element including a carrying element and an outwardly extending pin member, said pin member having inner and outer end portions each being provided with fitting surfaces and axially spaced apart by an elongated intermediate portion of substantially reduced cross-section, and a supporting rod having a tubular socket end adapted to frictionally engage said inner and outer end portions of said pin member, the peripheral edge of said fitting surface on said outer end portion having a generally arcuate configuration and being formed in conjunction with said intermediate portion to permit partial intercoupling of said joint element and said supporting rod at an angle to the axis of said pin member so that said joint element and supporting rod may be assembled by initial askew intercoupling of the tubular socket end with the outer end portion of said pin member and by final aligned intercoupling of said tubular socket end with both said inner and outer end portions.

6. A joint member for use in assembling a structural framework wherein a number of tubular rod elements having hollow end portions are employed, which joint member comprises a carrying element, and a plurality of elongated pin members secured to and extending outwardly from said carrying element in preselected space relation from each other, each of said pin members having an outer fitting portion and an inner fitting portion joined by an intermediate portion of reduced cross-section that merges with said inner fitting portion by way of an elongated tapered section, each of said outer fitting portions being proportioned to complement the internal configuration and dimensions of the hollow end portion of said tubular rod elements and being constructed with a generally arcuate peripheral surface so that said rod elements can be moved at an angle relative to the longitudinal axis of said pin members when said rod elements are coupled only to said outer fitting portion, said inner fitting portion being formed to complement the internal configuration and dimensions of the hollow end portion of said tubular rod elements so that said tubular rod elements are maintained in axial alignment with said pin members when the hollow end portion thereof has been guided into engagement with said inner fitting portion by said tapered section.

References Cited in the file of this patent
UNITED STATES PATENTS
2,684,261    Krohm _____ July 20, 1954
FOREIGN PATENTS
530,415    Italy _____ July 9, 1955
90,082    Sweden _____ Aug. 24, 1937